E. C. HANSON.
UNDERGROUND LOOP ANTENNA.
APPLICATION FILED MAR. 19, 1919.

1,373,612.

Patented Apr. 5, 1921.

WITNESS:
J. B. Brady

INVENTOR.
Carl C. Hanson

UNITED STATES PATENT OFFICE.

EARL C. HANSON, OF WASHINGTON, DISTRICT OF COLUMBIA.

UNDERGROUND LOOP-ANTENNA.

1,373,612.  Specification of Letters Patent.  Patented Apr. 5, 1921.

Application filed March 19, 1919. Serial No. 283,517.

*To all whom it may concern:*

Be it known that I, EARL C. HANSON, a citizen of the United States, and resident of Washington, District of Columbia, have invented a new and useful Improvement in Underground Loop-Antennæ, of which the following is a specification.

My invention relates to underground antenna systems for receiving radio signals, and more particularly to underground loop forms of antennæ.

The object of this invention is to provide a loop antenna adapted to be incased in a conduit and buried beneath the earth.

A further object of the invention is to provide such an underground loop antenna with filter coils inserted at intervals in the turns of the loop to prevent response to shock impulses produced by stray waves.

Referring to the drawings.

Figure 1:
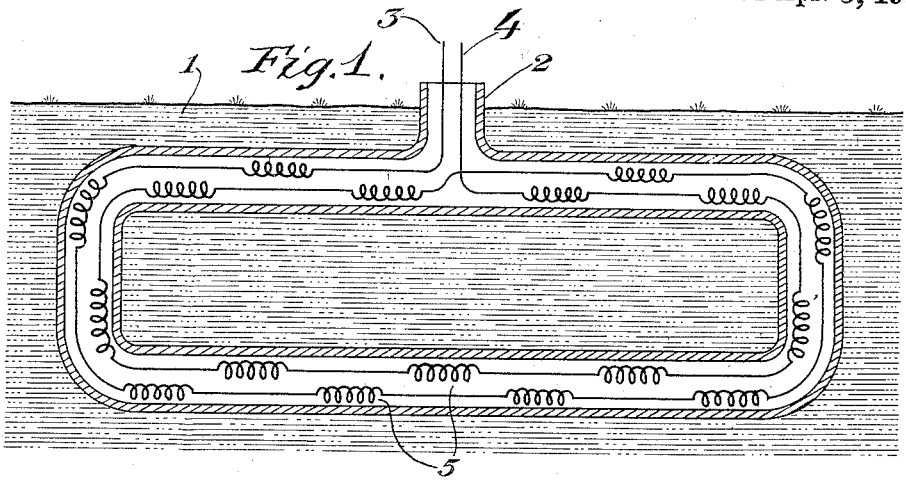
Figure 1 shows diagrammatically an underground vertical loop antenna.

Referring now more particularly to Fig. 1, reference character 2 represents a conduit buried in the earth 1. The conduit 2 is positioned vertically beneath the earth and incloses a number of convolutions of cable terminating at 3 and 4. Suitably located at intervals in the turns of the loop are filter coils 5 for the purpose to be more fully described hereinafter.

Figure 2:
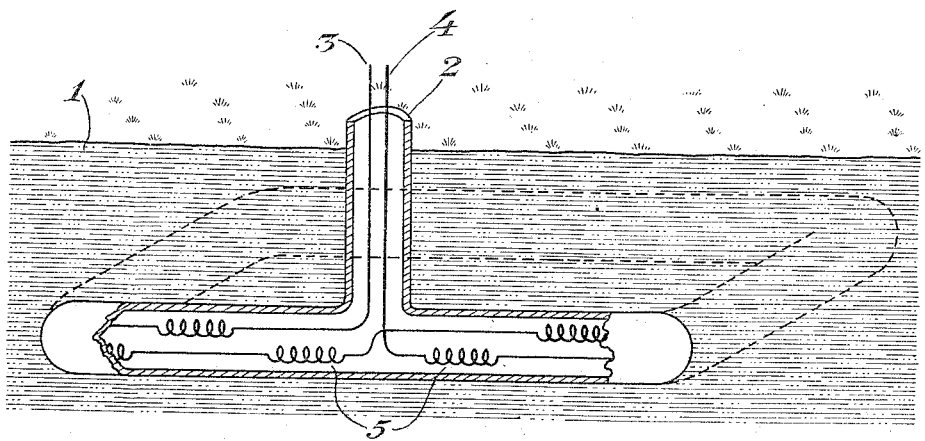
Fig. 2 is a modification of Fig. 1, and indicates an underground loop antenna arranged in a horizontal plane below the surface of the earth.

Fig. 2 represents a loop antenna system similar to that disclosed in Fig. 1, wherein the plane of the looped turns is parallel to the earth's surface.

This loop system is connected to suitable receiving apparatus at terminals 3 and 4. While the system has been described for use in conjunction with receiving apparatus, it is obvious that the antenna could be connected at 3 and 4 with radio transmitting apparatus and operated as a transmitting antenna. In Figs. 1 and 2, the loop system is shown as being underground, but it is well understood by those skilled in the art that such a loop antenna system can be submerged in water.

In Figs. 1 and 2, the loop antenna systems are shown buried in a conduit. This conduit may be of any suitable material. In some cases it would be feasible to employ heavy insulated binding around the convolutions of the loop.

Considering the phenomenon of induced currents in the vertical loop coil, Fig. 1, from progressing radiated wave trains perpendicular to the surface of the earth, it is well known in the art that radiated waves do not penetrate earth or water to any appreciable depth. To utilize this phenomenon in an underground loop system, the coil shown in Fig. 1 is constructed of such dimensions and placed at such a depth as to allow only the top convolutions to be cut by the progressing wave trains, thus inducing currents which will actuate receiving apparatus connected to the terminals 3 and 4.

In Fig. 2 the progressing radiated perpendicular wave trains will induce currents in the turns of the horizontal loop and thereby actuate receiving apparatus connected to the terminals 3 and 4.

The filter coils 5 while not absolutely necessary are shown in the turns of the loop for the purpose of rendering the antenna irresponsive to any undesired frequency or shock excitation.

Resonant currents produced by passing wave trains of a definite frequency pass freely through the filter coils 5, while shock impulses produced by stray waves or waves of undesired frequencies are choked or filtered out. By filter coils it will be understood by those versed in the art is meant impedance or retardation coils represented at 5 throughout the several figures.

What I claim is:—

1. An underground antenna system for radio signaling comprising a looped coil inclosed in a conduit and arranged perpendicularly to the surface of the earth, and means electrically connected in the convolutions of the loop for substantially eliminating response to strays.

2. An underground antenna system for radio signaling comprising a looped coil having a plurality of turns positioned perpendicularly to the surface of the earth arranged below said surface and a series of filter coils inserted at several points in the turns of the looped coil for substantially eliminating shock impulses in said coil.

3. An underground antenna system for radio signaling comprising a looped coil inclosed in a conduit and buried beneath the surface of the earth and including a series of inductance coils within the turns thereof whereby response to shock excitation is substantially eliminated.

In testimony whereof I affix my signature.

EARL C. HANSON.